June 23, 1970     M. H. O'LINK     3,516,098
FLOATABLE LIFE PRESERVER SEAT INSERT
Filed July 9, 1969     2 Sheets-Sheet 1
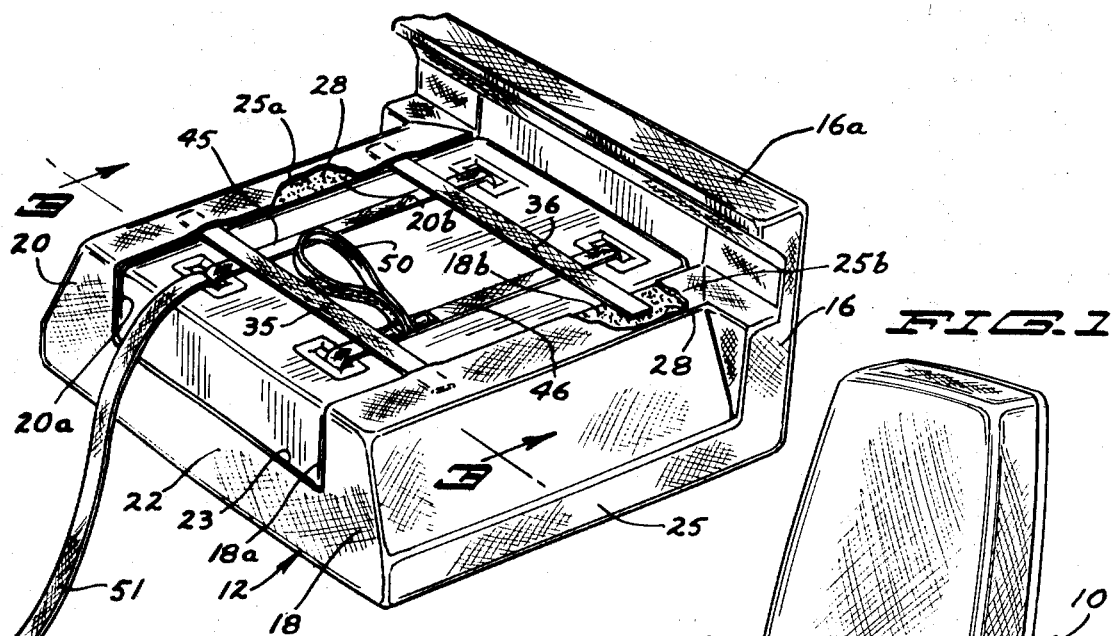
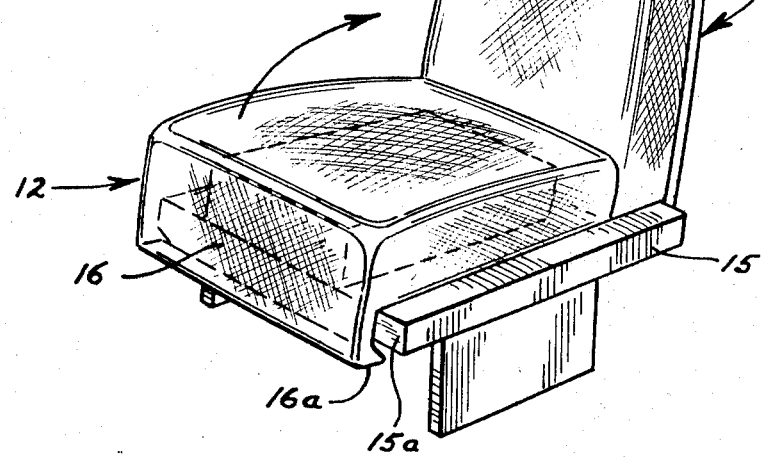
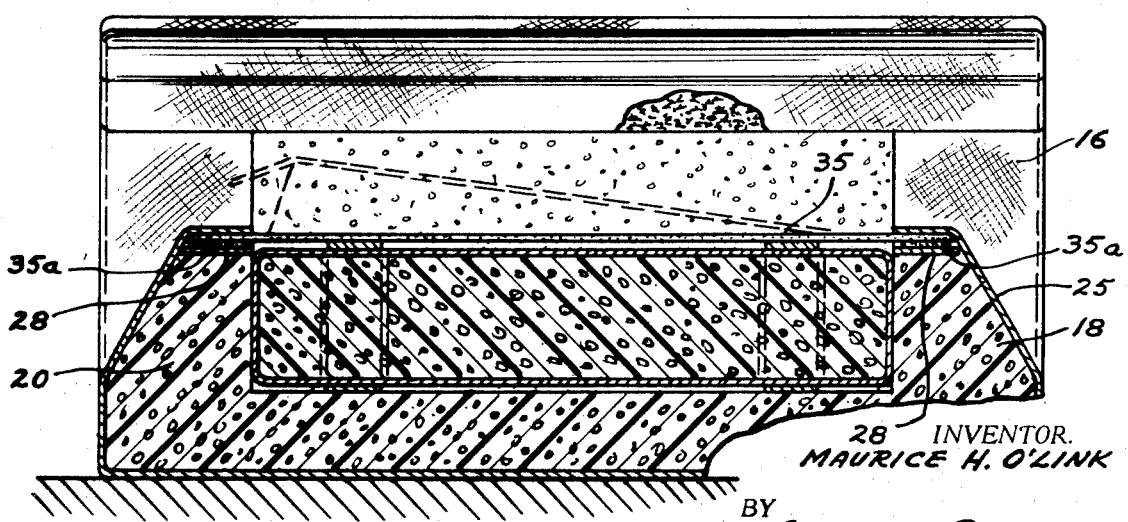
INVENTOR.
MAURICE H. O'LINK
BY
Reifand Gregory
ATTORNEYS

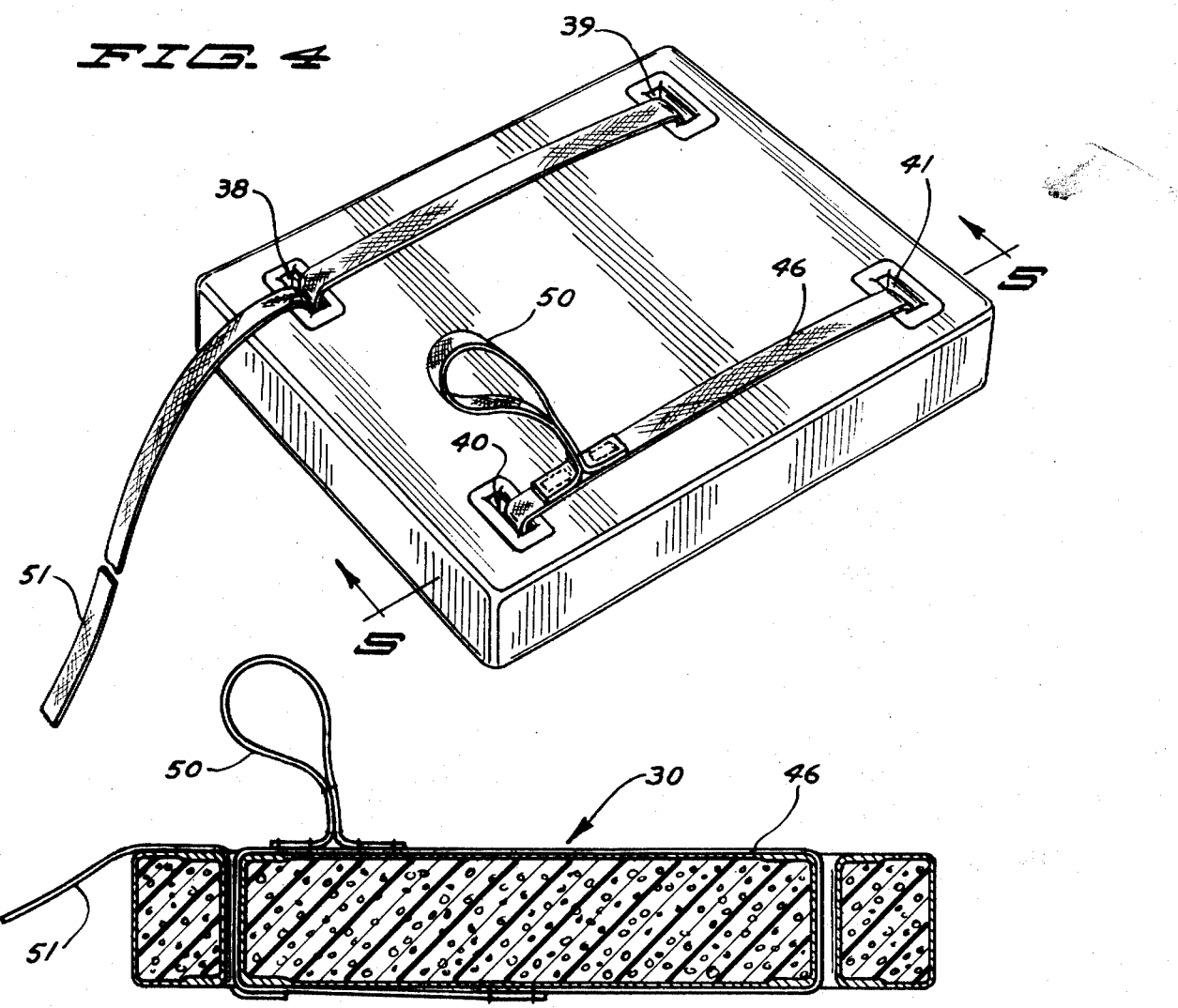

United States Patent Office 3,516,098
Patented June 23, 1970

---

3,516,098
FLOATABLE LIFE PRESERVER SEAT INSERT
Maurice H. O'Link, St. Cloud, Minn., assignor to Stearns Manufacturing Company, St. Cloud, Minn., a corporation of Minnesota
Filed July 9, 1969, Ser. No. 840,316
Int. Cl. B63c 9/30; B64d 25/04
U.S. Cl. 9—12                                  2 Claims

ABSTRACT OF THE DISCLOSURE

A life preserver cushion formed as an insert for an airplane seat structure being removably carried within a chamber formed within the underside portion of the removable bottom seating portion of said seat structure, said cushion being of relatively small size for convenient handling and use, being well adapted to support a person in a body of water, and having arm grasping and wrist holding straps for secure holding and a trailer strap for recovery thereof if floating free. Said cushion in stored position serves as an integral supporting portion of said seating portion.

SUMMARY AND BACKGROUND OF THE INVENTION

Airplanes flying over bodies of water, such as those having overseas routes, are required to have floatable life preservers readily available for passengers. The bottom seating portions of the seats of such airplanes are conventionally arranged to serve as life preservers. These seat portions are bulky and handling one of these is difficult for a person in an emergency situation when all passengers are milling about desperately seeking escape from the confines of the airplane. It is desirable to have a fully adequate floatable life preserver formed as a cushion sufficiently small in size to be handled readily without interfering with or adding burden to a person's efforts to escape from a confined area and through what might be a relatively small escape hatch or opening and which in stored position may serve as an integral portion of a seat structure.

Generally stated therefore, the invention herein consists of a relatively small compact floatable life preserver cushion arranged to be inserted or disposed into a chamber formed within the underside of the bottom seating portion of an airplane seat structure and being readily removable therefrom as by a jerk upon a strap thereof upon said bottom seat portion being turned over, said life preserver cushion having holding straps encircling the same, with such straps being capable of being grasped by the arms of a person thrust thereunder or by slipping a wrist through a wrist holding strap, and in connection therewith is a trailing strap making it relatively easy to recover said life preserver cushion if floating in a body of water. Said life preserver cushion is very satisfactorily made of suitable plastic foam material.

It is an object of this invention therefore to provide a compact life preserver cushion retained in stored position within the underside of the seating portion of an airplane seat as an integral functional portion thereof.

It is another object of this invention to provide a compact life preserver cushion having holding means thereon encompassing said life preserver for secure anchorage thereto.

It is also an object of this invention to provide a compact life preserver cushion arranged to be conveniently handled and carried by a person without burdening or providing any substantial impediment to his movement.

These and other objects and advantages of the invention will be set forth in the following description made in connection with the accompanying drawings in which like reference characters refer to similar parts throughout the several views and in which—

FIG. 1 is a view in perspective on a reduced scale showing a seat structure with some portions thereof being in dotted line;

FIG. 2 is a bottom view in perspective of the bottom seating portion of an airplane seat with portions being broken away;

FIG. 3 is a view in vertical cross section taken on line 3—3 of FIG. 2 as indicated, with a portion thereof being shown in dotted line in a moved position;

FIG. 4 is a view in perspective of the life preserver cushion herein on a magnified scale; and FIG. 5 is a view in vertical section taken on line 5—5 of FIG. 4 as indicated.

DESCRIPTION OF A PREFERRED EMBODIMENT

Referring to FIG. 1, a seat structure 10 is shown which is representative of the general form of conventional seat structures such as are installed in airplanes and particularly in those engaged in flying overseas routes.

It is required that airplanes flying overseas routes have floatable life preservers for passenger use. It has become a practice to form the bottom seating portion of a seat structure to serve as a life preserver. The bottom seating portion simply rests in position supported by the base frame portion of the seat structure. For use, a passenger simply grasps the leading edge of said seat portion by hand and pulls it up and away from the seat structure. Such bottom seat portions generally have a strap or spaced straps cemented to the underside of said seat portion or secured to the material covering said seat portion to serve as hand holding members.

Bottom seat portions are bulky to handle and they tend to burden the person carrying the same. The tendency is to hug said seat portion to the chest and the bulk of the seat portion forms a substantial impediment to a person's movement attempting to leave a plane through a limited opening in a crowded and hysterical type of emergency situation with respect to the passengers.

The invention herein utilizes a conventional seat structure and substitutes in place of a conventional bottom seating portion the seating portion 12 which is indicated in FIG. 1. Said seating portion 12 in outer form is not unlike a conventional seat portion, but its underside is particularly adapted and constructed in view of the invention here.

Shown in FIG. 2 is said bottom seating portion 12 in an overturned position showing details thereof. Said seating portion 12 in the embodiment here presented is shown having a front wall 16 of some length having an inwardly extending lip portion 16a which underlies the leading edge portion 15a of the base frame portion 15 of said seat 10. Said seating portion has side walls 18 and 20 of shorter length than said front wall and a rear end portion 22. A cavity or chamber 23 is formed bounded by the inner sides 18a and 20a of said side walls and by the inner side 16a of said front wall. Said chamber is open at the rear end portion 22.

Said seating portion 12 is conventionally upholstered with a slip cover and the same is here indicated by the reference numeral 25. Said slip cover has edge portions 25a and 25b overlying the bottom walls 18b and 20b of said sides 18 and 20. Strips 28 of releasable holding material of the type indicated well known as Velcro will overlie and be secured to said bottom walls 18b and 20b as by being cemented thereto.

Inserted within said chamber 23 is a floatable life preserver cushion 30 here shown to be substantially parallelepiped in form to correspond to the form of said chamber. Said life preserver cushion 30 is retained in position within said chamber by a pair of straps 35 and 36 which have their ends equipped with Velcro strips to overlie and be releasably secured to said strips 28, as shown in FIG. 2. Said straps are shown underlying the adjacent portions of said slip cover 25.

Said life preserver cushion 30 is very suitably formed of a polyvinyl chloride foam material with the addition thereto of sufficient rubber to provide durable resilience for comfort in forming support for said bottom seating portion. Said foam material has excellent floatability. Said life preserver cushion of a size on the order of twelve by sixteen by two and one-half inches has proved to have the capability of supporting on the order of sixteen pounds in a body of water. The average person has a weight on the order of eight to twelve pounds in a body of water.

Said life preserver cushion is substantially smaller in size than is said bottom seating portion 12 and is readily handled and carried by a person.

To provide substantial resistance to deterioration, it is desirable to apply a vinyl coating to said cushion, which coating forms a tough durable hide but is not here indicated.

Said cushion 30 has spaced openings or slots 38, 39, 40 and 41 therethrough running from top to bottom. Disposed through the openings 38 and 39 is a strap 45 and disposed through the openings 40 and 41 is a strap 46. Said straps preferably will have their respective free ends secured together to be endless in form. Said straps are preferably formed of a material such as a polypropylene, which material has a long lasting useful life and has excellent resistance to deterioration in water.

The strap 46 is shown having a wrist holding strap 50 secured thereto on the order of a lanyard. The strap 45 is shown having a streamer or trailer strip 51 secured at one end thereto which may be of a five or six foot length.

OPERATION

The invention herein represents a substantial improvement over known airplane floatable life preservers in being of such small size as to be conveniently handled by a person without it becoming a burden to such person and it is storable within a seat structure to form a normally used portion thereof, thus requiring no separate storage space and it is directly and instantly available to each passenger aboard an airplane.

When required for use, a passenger with one hand grasps the portion 16a of the seating portion 12 to lift up and overturn said portion and with the other hand said passenger grasps a strap 45 or 46 or the wrist strap 50. Responsive to a pull or jerk on the cushion, the Velcro secured straps 35 and 36 pull free releasing the cushion 30. All this may be carried out by a passenger in the continuous motion of arising from the seat, lifting up the seating portion 12 and grasping the life preserver cushion 30 and pulling it free as the passenger looks for an escape path from the airplane. By inserting his wrist into the wrist strap 50, the passenger has a secure hold and the chances are remote that the life preserver cushion will be jerked or torn away from him.

It will be noted that the straps 45 and 46 encompass inner portions of the cushion 30 and are endless in construction. Hence said straps will not have any tendency to break free or become separated from the cushion. For a more secure hold, an arm or both arms may be passed between said straps and said cushion.

The streamer or trailer 51 has significant importance. When the cushion is floating in a body of water, it will be more readily reachable or recoverable by a person than otherwise by means of the streamer which may have a length of five or six feet. Said streamer may be doubled upon itself and have its free ends pressed into the openings 38 and 39 in being stored away.

Thus there has been provided a compact life preserver cushion stored away as an insert into a seating portion of a conventional type of seating structure readily available for instant use as a life preserver and otherwise normally used as an integral portion of the seat structure.

What is claimed is:
1. In combination with a seat structure,
   a removable bottom seating portion,
   a chamber within the under side of said seating portion,
   a floatable life preserver cushion disposed within said chamber,
   said cushion comprising
   a pair of spaced straps respectively disposed through said cushion to encompass inner portions thereof,
   said seating portion having sides defining said chamber,
   a pair of spaced strips overlying said cushion and engaging an opposed pair of said sides, and
   means carried by said opposed pair of sides for holding engagement with overlying end portions of said strips.
2. The structure set forth in claim 1, wherein
   one of said straps has a looped portion extending therefrom through which a wrist may be disposed, and
   one of said straps has a length of strap extending therefrom.

References Cited
UNITED STATES PATENTS
2,132,544 10/1938 Shaw _____ 9—312
2,623,574 12/1952 Dansch _____ 297—111
3,154,345 10/1964 Lambrecht _____ 9—312 X MILTON BUCHLER, Primary Examiner J. L. FORMAN, Assistant Examiner U.S. Cl. X.R.
5—355; 244—122; 297—452